W. O. Bartlett,
Bridle,
N° 55,226.   Patented June 5, 1866.
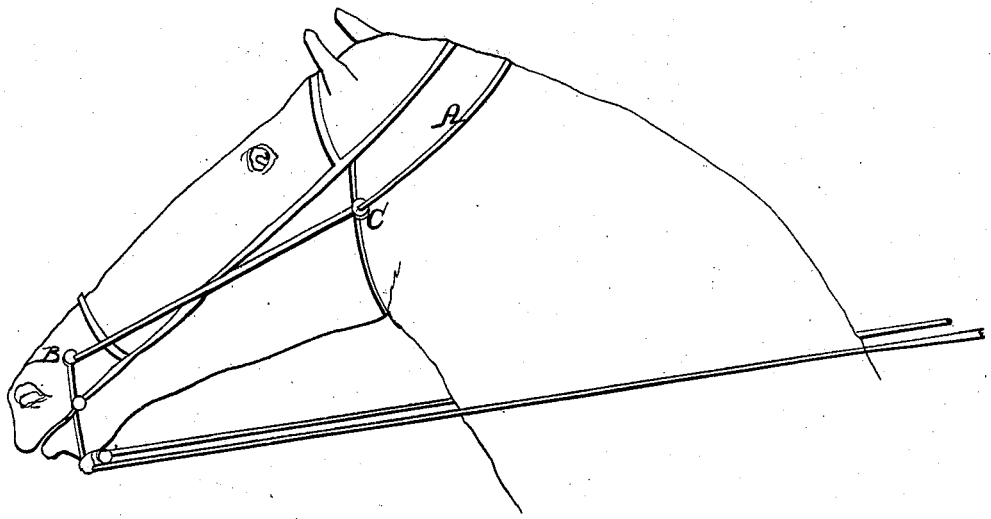
Witnesses;
Chas Mathews Jr
Andrew Zani Jr
Inventor;
William O. Bartlett

UNITED STATES PATENT OFFICE.

WILLIAM O. BARTLETT, OF NEW YORK, N. Y.

IMPROVED BREAKING AND TRAINING BRIDLE.

Specification forming part of Letters Patent No. 55,226, dated June 5, 1866.

*To all whom it may concern:*

Be it known that I, WILLIAM O. BARTLETT, of the city, county, and State of New York, have invented a new and useful Improvement in Bridles for Horses and other Animals; and I do declare that the following is a full and exact description thereof, reference being had to the accompanying drawings, and to the letters of reference marked thereon.

The nature of my invention consists in attaching to the bridle a cord or strap in such manner that by pulling on the reins there is produced a pressure downward on the sensitive part of the neck and upward in the mouth of the animal at the same time, which is found by experience to reduce him absolutely under control.

One method of constructing this improvement is by attaching one end of the cord or strap to the upper ring of a curb-bit, passing it thence, through a loop on the throat-latch, over the horse's neck a few inches behind the ears, and down the other side through a similar loop, fastening the other end to the opposite ring of the bit. Another method is, in cases in which the ordinary bit is used, to have the cord or strap which goes over the animal's neck to pass, at both ends, through the rings of the bit, and attach it to the guiding or driving reins.

In the accompanying drawings, A represents the cord or strap which passes over the animal's neck; B, the upper ring of a curb-bit; C, the loop, which I prefer to have on the throat-latch, for the cord or strap to pass through. I have one of these each side of the horse's head. On some bridles I attach the loop, by another very short strap, to a buckle, so as to regulate more exactly the position of the cord or strap over the animal's neck.

What I claim as my invention, and desire to secure by Letters Patent, is—

An improvement in bridles by attaching a cord or strap to the same, so constructed that by pulling on the reins a pressure is produced downward on the sensitive part of the animal's neck and upward in his mouth, substantially as herein described.

WILLIAM O. BARTLETT.

Witnesses:
 CHAS. MATTHEWS, Jr.,
 ANDREW ZANE, Jr.